United States Patent [19]
Hu et al.

[11] 3,911,303
[45] Oct. 7, 1975

[54] COPPER COMMUTATOR-ALUMINUM WINDING ARMATURE

[75] Inventors: Paul Y. Hu; Kenneth N. Karol, both of Boulder; Gary A. Puzo; Bradford C. Schwartz, both of Longmont, all of Colo.

[73] Assignee: International Business Machines Corporation, Armonk, N.Y.

[22] Filed: Aug. 19, 1971

[21] Appl. No.: 173,171

[52] U.S. Cl. .............. 310/236; 310/232; 310/233; 310/266
[51] Int. Cl.² ............................................ H02K 13/04
[58] Field of Search ....................... 310/233–237, 310/262, 264, 265, 266, 267

[56] References Cited
UNITED STATES PATENTS

| | | | |
|---|---|---|---|
| 499,350 | 6/1893 | Parshall | 310/236 |
| 1,922,317 | 8/1933 | Mudge | 310/236 |
| 2,037,457 | 4/1936 | Colson | 310/232 X |
| 2,436,910 | 2/1948 | Werner | 310/236 |
| 2,696,570 | 12/1954 | Pandapas | 310/232 |
| 3,488,539 | 1/1970 | Tucker | 310/268 |
| 3,490,672 | | Fisher et al. | 226/188 |

FOREIGN PATENTS OR APPLICATIONS

| | | |
|---|---|---|
| 1,014,663 | 12/1965 | United Kingdom |
| 1,051,467 | 12/1966 | United Kingdom |
| 937,183 | 12/1955 | Germany |

*Primary Examiner*—Mark O. Budd

[57] ABSTRACT

A high-torque low-inertia armature for use with an electric motor wherein the armature winding is formed of aluminum conductors, and wherein a copper commutation band is formed on selected aluminum conductors in a manner to mechanically lock each commutator segment to its aluminum conductor, the locking structure being constructed and arranged to continue to function as the motor brush wears away to the top surface of the aluminum conductor.

8 Claims, 8 Drawing Figures

COPPER COMMUTATOR-ALUMINUM WINDING ARMATURE

SUMMARY AND BACKGROUND OF THE INVENTION

The present invention pertains to the field of electrical generator or motor structure, and more particularly to the rotor or armature structure of a rotary dynamoelectric machine, and to the current collector or commutator thereof.

The prior art teaches the advantages to be realized by using an aluminum winding and a copper-to-aluminum commutator interface in a low-inertia armature. Specifically, this prior art forms a disk armature of stamped aluminum conductors, a selected layer of the aluminum conductors including a copper commutator segment on only the top surface of the conductors. The conductors which are to be used in this commutation layer are stamped out of a sheet of aluminum on which a continuous copper surface has first selectively deposited, as by plating, by thermo-compression bonding, or by the step of etching away unwanted copper from all other areas of the aluminum sheet.

Other prior art suggests that a copper commutator can be obtained by using copper conductors in the commutator layer of a disk armature winding, and using aluminum conductors in all other layers of the winding.

The present invention is directed to a low-inertia armature having an aluminum winding wherein the aluminum conductors, at least in the commutator portion, have converging side walls, that is, the top surface of the conductor is undercut. Thus, the cross-sectional shape of the aluminum conductor represents a wedge or a sector. A commutation metal, having good commutation properties, for example a metal such as copper, rhodium, or bronze, is then mounted, as by plating, on the wedge-like shape to overlap the converging side wall surfaces of the aluminum conductor and thus mechanically lock the commutation metal to the aluminum conductor.

The present invention additionally forms the commutation metal to have a generally flat-topped dome shape. With this shape, commutator wear is minimized and the thickness, and thus the mass, of the commutation metal which forms the brush interface is reduced. A resulting tubular armature has a minimized inertia since the commutation metal, which is supported at the greatest radius from the center of rotation, has a minimized mass. Thus, in an aluminum armature, good commutation is achieved with little increase in inertia.

As a further feature of the present invention, the commutation metal is of a dimension to present a commutator axial length which is greater than the axial length of associated brushes. In this way, should brush-wear expose the aluminum conductor, not only is good commutation preserved by virtue of the remaing poritons of the commutation metal which extend down the converging side walls of the aluminum conductor, but also, these portions of the commutation metal are mechanically held together by the remaining anchoring band or bands of commutation metal which overlap the top of the aluminum conductor and were not worn away by the brushes.

The foregoing and other features and advantages of the invention will be apparent from the following more particular description of the preferred embodiment of the invention, as illustrated in the accompanying drawing.

DESCRIPTION OF THE PREFERRED EMBODIMENT

While the present invention can be used to advantage with armatures having different physical shapes, such as a disk or a cone armature, it will be described with reference to a hollow tubular armature of the type disclosed, for example, in above-mentioned U.S. Pat. No. 3,490,672, but without limitation thereto.

Figure 1:
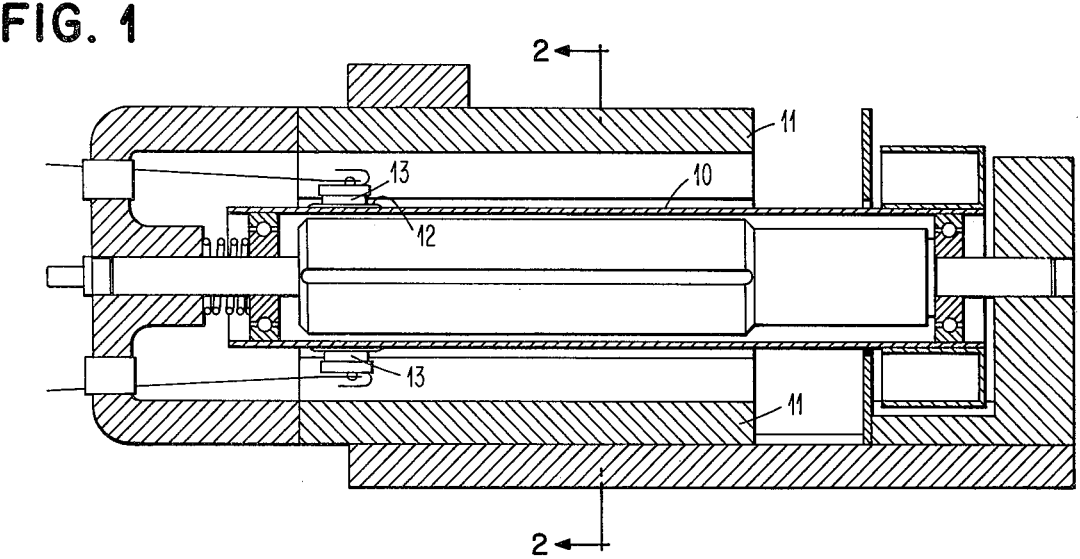
FIGS. 1 and 2 illustrate a prior art high-torque low-inertia motor, of the type disclosed in U.S. Pat. No. 3,490,672, issued to G. A. Fisher and H. E. Van Winkle, with which the armature of the present invention can be used to advantage.
Figure 2:
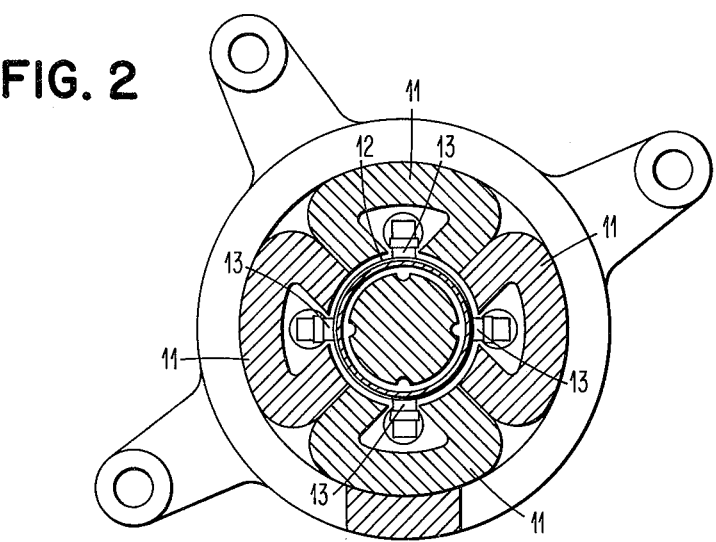

Referring to FIGS. 1 and 2, hollow tubular armature 10 is supported for rotation relative to four stationary permanent magnets 11. The armature carries a built-up copper commutator band 12 which forms the armature-brush interface and facilitates electrical connection between the armature winding and four stationary brushes 13.

Figure 3:
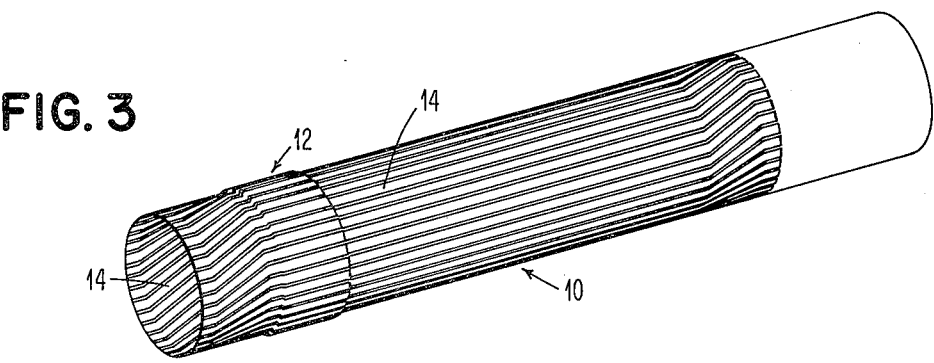
FIG. 3 shows the winding details of a tubular armature such as shown in FIGS. 1 and 2, wherein the armature incorporates the present invention, including a built-up copper commutator band which forms the armature-brush interface for an aluminum conductor winding.

With reference to FIG. 3, armature 10 includes an inner tubular substrate member formed of electrical insulating material, for example, a fiber glass/epoxy tube. The inner and outer tubular surfaces of this substrate support tube include a plurality of axially extending aluminum conductors 14. Each individual conductor 14 in the outer tubular layer of conductors carries a built-up copper commutator segment in the area of commutator band 12.

By way of example, armature 10 of FIG. 3 may include a wave-type winding which is constructed by the use of printed circuit techniques, as by utilizing the teachings of the co-pending U.S. Pat. application of Kenneth N. Karol, application Ser. No. 66,938, filed Aug. 26, 1970, now U.S. Pat. No. 3,650,021.

As previously mentioned, the light weight characteristics of aluminum have been used to advantage in the field of low-inertia armatures. Also, since aluminum is not a good commutation metal, the prior art provides a copper commutation band on the top surface of the aluminum conductors to form the brusharmature interface.

The present invention is concerned with an improved commutator for an aluminum armature winding, and method of making the same, having the various features described. While reference is made to the use of copper as the commutation metal, the present invention, in its broader aspects, is not to be restricted thereto, commutation metal being defined as a material which forms a brusharmature interface having good electrical and mechanical properties. Also, while reference is made to aluminum or an alloy thereof, the present invention is not to be restricted thereto, but rather is usable with conductor metal which does not have good commutation properties.

FIGS. 4–8 show a single outer-surface aluminum conductor 14 of FIG. 3, greatly enlarged, and specifically the construction of the commutator portion thereof.

Figure 4:
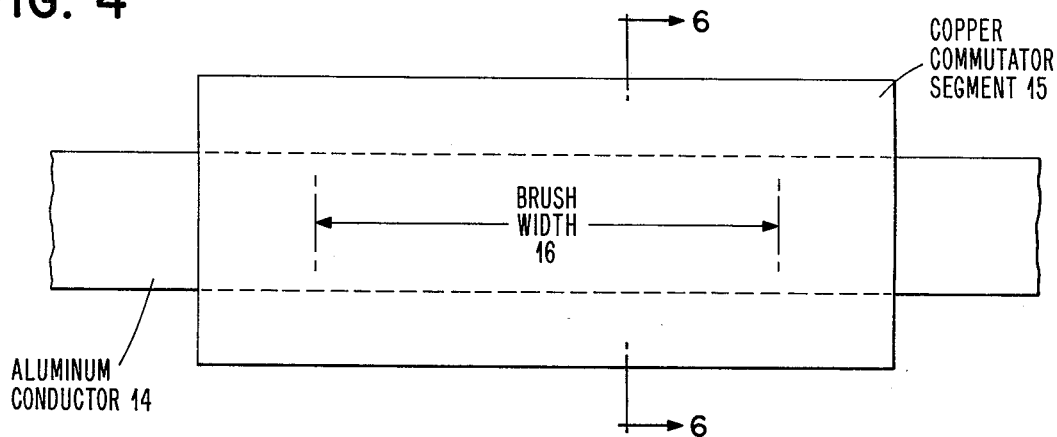
FIG. 4 is a top view of a single aluminum conductor of FIG. 3 and its copper commutator segment.

From FIG. 4, it can be seen that copper commutator segment 15 spans an axial length of conductor 14 which is greater than the axial length of the motor brushes, this length being represented by dimension 16. By way of example, dimension 16 may be 0.375 inch, the axial length of the commutator segment being 0.625 inch. The width of conductor 14 at the top surface as seen in FIG. 4 may be 0.030 inch.

Figure 6:
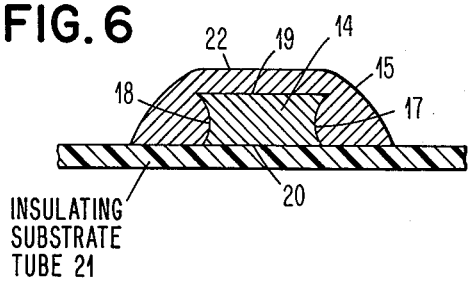
FIGS. 6 and 7 are section views of the FIGS. 4 and 5, respectively.

FIG. 6 is a section view of FIG. 4, taken along line 6—6. Herein it can be seen that aluminum conductor 14 is undercut and is generally sector or wedge-shaped. It is recognized that the disclosed undercut construction can be produced by a number of methods, for example, chemical milling or etching, grinding, punching or stamping. For the purpose of this description and the appended claims, the term undercut is defined as a side wall constructed whereby side walls 17 and 18 of conductor 14 are formed in a manner to achieve good adhesion, bonding or mechanical interlocking of the commutation metal to the side walls of the conductor. The preferred embodiment is a construction whereby the required undercut is produced by a chemical milling or etching process. However, it is recognized that such an undercut may take other forms, for example, the conductor may have generally parallel or even slightly diverging side walls, where the walls are rough and contain small undercut portions that allow the commutation metal to be adequately mounted on the side wall. This conductor is formed in this unique shape to provide mechanical interlock of commutator segment 15 to the aluminum conductor. More specifically and in accordance with the preferred embodiment, aluminum conductor 14, at least in the portion of the conductor which forms the commutator band, has two converging side walls 17 and 18, these walls beginning at a relatively broad upper surface 19, converging to form an undercut section, and then diverging somewhat to terminate at a lower surface 20, this lower surface being mechanically secured to the insulating substrate tube 21. In the example cited above, the degree of undercut for a 0.003 inch thick conductor may be 0.001 inch. The present invention is not to be limited to the specific cross-sectional shape disclosed in FIG. 6, for example, the side walls could just as well continuously converge to terminate at a relatively narrow lower surface 20.

As will be appreciated by those of ordinary skill in the art, each individual commutator segment 15 is formed such that it is electrically isolated from the adjacent commutator segments, not shown, by an intervening surface of the insulating substrate tube 21, this spacing being, for example, 0.009 inch.

While the method by which aluminum conductor 14 is formed to have an undercut, and thus a generally wedge or sector cross-sectional shape, is not critical to the broader aspects of the present invention, chemical milling techniques may be utilized to achieve this unique shape. With such a technique, and in accordance with the general teachings of the abovementioned co-pending patent application, all of the outer conductors of the tubular armature of FIG. 3 may, for example, be formed of a sheet of aluminum having a thickness of 0.003 inch. The conductor pattern shown in FIG. 3 is outlined by a photosensitive resist which is applied to this aluminum surface. Preferably, a microscopically porous surface is first formed on the aluminum, as by conversion coating techniques, in order to achieve good resist adhesion. As is well known, the amount of sideward etch growth immediately under the photoresist image is reduced when good resist adhesion is achieved. The uncoated areas of aluminum, that is, the spaces between adjacent conductors 14 of the armature, FIG. 3, are removed by aluminum etching techniques, and these techniques are adjusted to produce an undercut such that the aluminum conductors are formed with converging walls 17 and 18. By way of example, but without limitation thereto, an aluminum etching bath can be prepared having the following formulation: 225 milliliters ferric chloride per liter of bath, 115 ml. ammonium persulfate per liter of bath, and 0.5 gm. sodium lauryl sulfate per liter of bath. With such a bath, the aluminum sheet is sprayed or otherwise exposed to the bath for a seven-minute period for each 0.003 inch thickness of the sheet, the bath temperature being maintained at 125° F.

After the aluminum conductors are formed, and a tubular armature such as shown in FIG. 3 is constructed, again, for example, as taught in the above-mentioned co-pending patent application, commutation band 12 is formed as by electroplating copper selectively onto this portion of the outer aluminum conductors 14 of the tubular armature.

In accordance with the teachings of the present invention, whatever technique is used to form the copper commutator segment 15 on aluminum conductor 14, the selected technique must place copper on the upper surface 19 of the aluminum conductor and on the converging sidewalls 17 and 18 of the conductor. Furthermore, it is preferred that the selected technique form a unique flat-topped, dome-shaped or convex commutator segment as shown in FIG. 6. With such a shape, the brush encounters a gentle rising surface as it moves across the commutator segment and brush wear is minimized. Furthermore, should the brush wear away the commutator segment, the exposed copper commutator area at first increases. Should the commutator wear continue to an excessive state, as shown in FIGS. 6 and 7, the brush continues to experience a copper interface to insure good commutation.

Figure 7:
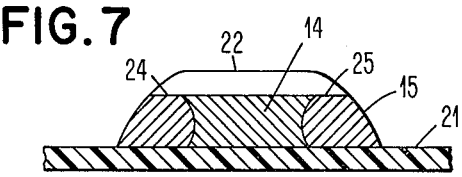
Figure 8:
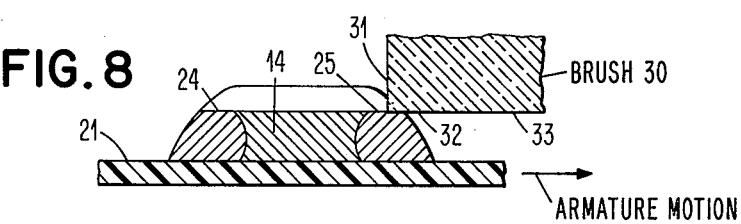
FIG. 8 shows the brush to commutator interface, with a worn commutatior and a mating brush.

FIG. 8 shows a worn commutator segment, much as shown in FIG. 7. In FIG. 8, the armature is shown moving to the right to first engage brush 30 with the lateral edge 25 of the copper commutator segment. As is well known, brush 30 may be wide enough to span a number of adjacent commutator segments. The current flow from the brush to the winding now takes place at this brush to copper interface. As the armature continues to move to the right, the leading edge 31 of the brush engages aluminum conductor 14. Due to oxide formation at the aluminum surface, little or no current flows between the leading edge of the brush and the aluminum conductor. However, the surface 32 of the brush now engages the axially extending copper strip formed by edge 25. At this time, current flow takes place at the interface of edge 25 and the portion 32 of the brush. As the armature continues to move to the right, the brush leading edge 31 contacts the opposite lateral edge 24 of the copper commutator segment. The current flow from the brush to the winding now takes place at both this interface and at the new interface between edge 25 and the surface 33 of the brush.

While the present invention is not to be limited thereto, an exemplary electroplating technique whereby copper commutator segments may be selectively electroplated on the outer aluminum conductors of the armature of FIG. 3 may have the parameters as hereinafter defined.

Good adhesion of the copper commutator segment to the aluminum conductor can be achieved by first forming a layer of zinc on the aluminum conductor. In forming this layer of zinc, the aluminum conductor is first cleaned, for example, by degreasing with trichlorethylene, followed by an alkaline cleaning or etching step and an acid bath to remove the smut formed by the alkaline bath step. Each of these three steps is followed by a water rinse step.

After cleaning, the aluminum conductor is submersed in an alkaline zincate solution. This bath dissolves the aluminum oxide from the exposed surface of the conductor and coats the aluminum with a thin adherent deposit of metallic zinc.

The zinc coated aluminum, properly masked, is then placed in a copper cyanide bath and which is operated as a strick to place a thin layer of copper on the zincated layer.

This is followed by an electroplate step. In order to obtain a copper deposit which is of the flat-topped dome, or convex shape shown in FIG. 6, it is necessary to properly thieve the plated commutator area and to control the plating parameters. As an example, a thief approximately one-eighth inch in axial length is circumferentially positioned at each axial end of the commutator segments shown in FIG. 3 to minimize the influence of high plating current density on the plated copper thickness. The combination of plating solution agitation and plating current density are balanced to obtain a radiused copper build-up on the side walls of the aluminum conductors.

Again by way of example, the final electroplate bath may consist of copper sulfate, 210 to 240 grams per liter of bath; sulfuric acid, 52.5 to 60 grams per liter of bath; chloride ion concentration of 75 to 90 parts per million; and UBACH brightener, 0.5 to 0.7 percent by volume. UBACH brightener is a proprietary brightening plating bath additive manufactured by Udylite Corporation. The bath temperature is controlled to 70° to 75° F. A plating current density of 56 to 61 amperes per square foot of area to be plated is maintained for a time in accordance with the required build-up of copper. For example, a build-up of generally 0.003 inch can be achieved in ninety minutes.

Another feature of the plating technique is the positioning of the armature in the plating tank and the solution agitation. For example, the masked armature may be suspended in the tank with its axial length vertical. The armature can then be rotated circumferentially at ten revolutions per minute and the solution air agitated sufficiently to raise the solution level approximately one inch.

Figure 5:
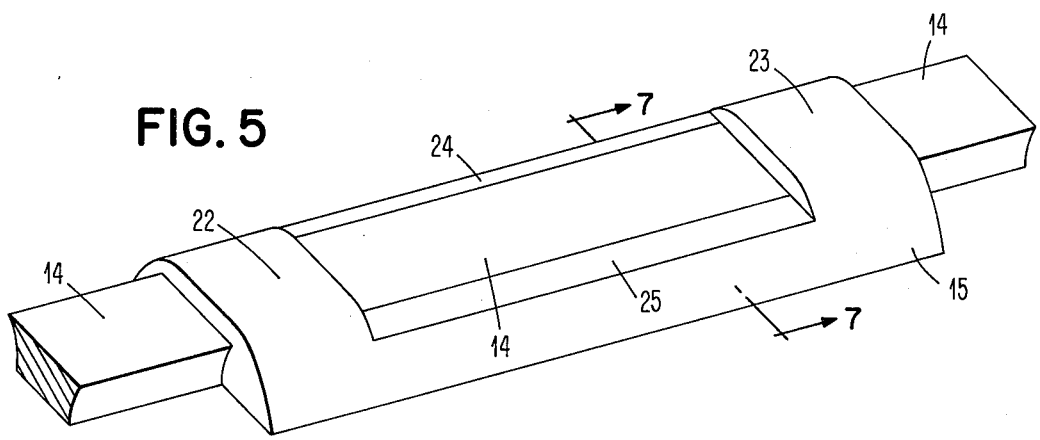
FIG. 5 is a perspective view of the conductor of FIG. 4, showing brush wear which has exposed the aluminum conductor.

As has been mentioned, the axial length of each individual commutator segment 15 is greater than the brush axial length 16. When excessive commutator wear occurs, as shown in FIGS. 5, 7 and 8, commutator segment 15 remains locked to aluminum conductor 14 both by way of the bond which exists between commutator edges 24 and 25 and the adjacent side walls of conductor 14, and by way of the end anchor or locking overlap portions 22 and 23 of the commutator segment which bridge the worn area.

While the invention has been particularly shown and described with reference to a preferred embodiment thereof, it will be understood by those skilled in the art that various changes in form and details may be made therein without departing from the spirit and scope of the invention.

What is claimed is:

1. An armature for use in a high-torque, low-inertia motor having brushes which directly engage the armature winding aluminum conductors to form a commutation interface, said commutation interface comprising; commutator segments spanning a length of the aluminum conductors which is greater than the length of said commutation interface to thereby insure a locking overlap of the aluminum conductors when said commutator segments wear to expose the underlying aluminum conductors to the brushes.

2. An armature as defined in claim 1 wherein the cross-sectional shape of said commutator segments is convex to thereby initially increase the commutation metal commutation area as the commutator segments wear.

3. An armature as defined in claim 2 wherein said commutator segments span an axial length of the aluminum conductors which is greater than the axial length of said commutation interface.

4. An armature as defined in claim 3 wherein said commutator segments are generally convex in cross-section.

5. An armature as defined in claim 4 wherein said commutation metal is copper.

6. An armature as defined in claim 5 wherein said commutator segments span an axial length of the conductors which is greater than the axial length of said brush interface.

7. An armature as defined in claim 6 wherein said commutator segments are generally convex in cross-section.

8. An armature as defined in claim 7 wherein said commutation metal is copper.

\* \* \* \* \*